United States Patent [19]

Vijayendran et al.

[11] 4,019,911

[45] Apr. 26, 1977

[54] TONER COMPOSITIONS

[75] Inventors: Bheema R. Vijayendran, Bethel; R. Clark DuBois, Fairfield, both of Conn.

[73] Assignee: Pitney-Bowes, Inc., Stamford, Conn.

[22] Filed: Sept. 25, 1975

[21] Appl. No.: 616,845

Related U.S. Application Data

[62] Division of Ser. No. 416,936, Nov. 19, 1973, Pat. No. 3,939,087.

[52] U.S. Cl. .................................. 106/23; 106/20; 106/22; 252/62.1 R; 252/62.1 L; 260/33.6 UA; 260/42.15

[51] Int. Cl.[2] .................................. C09D 11/00

[58] Field of Search ........................ 106/20, 22, 23; 252/62.1 L, 62.1 P, 62.1; 260/33.6 UA, 42.15

[56] References Cited

UNITED STATES PATENTS

| | | | |
|---|---|---|---|
| 3,720,617 | 3/1973 | Chatterji et al. | 252/62.1 P |
| 3,729,419 | 4/1973 | Honjo et al. | 252/62.1 |
| 3,819,367 | 6/1974 | Chatterji et al. | 252/62.1 P |
| 3,833,366 | 9/1974 | Madrid et al. | 252/62.1 |
| 3,840,464 | 10/1974 | vanEngland et al. | 252/62.1 P |
| 3,856,692 | 12/1974 | Mammino et al. | 252/62.1 |
| 3,939,085 | 2/1976 | Smith et al. | 252/62.1 L |
| 3,939,087 | 2/1976 | Vijayendran et al. | 106/23 X |

*Primary Examiner*—J. Ziegler
*Attorney, Agent, or Firm*—Peter Vrahotes; William D. Soltow, Jr.; Albert W. Scribner

[57] ABSTRACT

Disclosed herein are novel liquid toner compositions that are useful in copier duplicators. The toner compositions of the present invention are highly hydrophobic liquid toners for developing latent images and comprise pigment, dye, polymer and a silane treated fumed silica, the combination being suspended in a volatile isoparaffinic hydrocarbon vehicle.

5 Claims, No Drawings

TONER COMPOSITIONS

This is a division, of application Ser. No. 416,936 filed Nov. 19, 1973 now U.S. Pat. No. 3,939,087.

BACKGROUND OF THE INVENTION

This invention relates to liquid toners for use in a combination of electrostatic copier and lithographic printer generally known as a copier duplicator, and more particularly to compositions of toners wherein finely divided pigment, dye, polymer and a hydrophobic agent are suspended in a volatile hydrocarbon liquid having a high electrical resistance.

In electrostatic printers, a sheet having a photoconductive layer is given a electrostatic positive or negative charge in the dark, such as by means of a corona-charging device. The charge layer is then exposed to a light image of an original document to cause the charge on the layer to leak off in non-image areas and selectively leave a latent electrostatic charge image. This latent image is then developed by applying to the photoconductive layer a toner containing particles which have a charge opposite to the residual electrostatic charge image so that the toner particles adhere to the charged areas and form an image. In order to function properly for this purpose, the toner must be capable of producing a colored layer of suitable density on the charged areas without unduly coloring the background areas. Although there are many liquid toners which serve satisfactorily in the electrophotographic production of a single copy, where multiple copies are to be made, as in a copier duplicator, for various reasons prior toners have proven deficient.

In a copier duplicator the sheet having the image serves as a master in a combination electrophotographic and lithographic operation were many copies are to be produced. This includes the operation were the master may be part of an offset printer. In such an operation, a sheet having a photoconductor coating is given a charge as by a corona flash. The charged surface is then exposed to an original to be reproduced and an image is formed on the photoconductor surface. The sheet is then passed through a liquid toner wereby hydrophobic, oleophilic particles are electrostatically attached to the latent image. The master is then dried to set the toner, etched to render the background hydrophillic, dampened with water and them dampened with an oil based ink. In an offset operation the image is then transferred to a blanket from which it is subsequently transferred to the copy paper.

In a copier duplicator, the toner must not only obtain true reproduction over the image area, otherwise known as "fill-in", but it should also be highly hydrophobic and oleophilic as well as be impervious and resistant to etching chemicals.

SUMMARY OF THE INVENTION

It is an object of the present invention to provide a liquid toner composition for a copier duplicator which is strongly hydrophobic and oleophilic.

A further object of the present invention is to provide a highly hydrophobic liquid toner compositions which give images having good fill-in.

A still further object of this invention is to provide a highly hydrophobic and oleophilic liquid toner for use in a copier duplicator which is impervious and resistant to etching chemicals.

Another object of the present invention is to provide a highly hydrophobic liquid toner composition that can be used to produce a electrostatic offset master for use in lithographic printing.

These and other objects of the present invention will become apparent by reading the following detailed description.

DETAILED DESCRIPTION OF THE INVENTION

It has been found that the above objects may be attained and and improved liquid toner for a copier duplicator produced by the use of the present invention. The liquid toner composition of the present invention comprises a finely divided pigment, such as carbon black, a dye and a hydrophobic agent suspended in a hydrocarbon fluid containing a dissolved polymer. The hydrophobic agent which has been found to have particular utility in a liquid toner is a silane treated fumed silica.

The term silane treated fumed silica is defined for the purposes of this invention as fumed silicon dioxide which is treated with an organosilicon compound in which some of the bonds of a silane linkage are substituted by saturated or unsaturated hydrophobic organic groups. The saturated organic groups include methyl, ethyl, propyl, butyl, bromomethyl, choromethyl, chloroethyl and chloropropyl groups. The unsaturated organic groups include vinyl, chlorovinyl, allyl, allyll-phenyl, and methacryloxypropyl. It will be appreciated that some of the organosilicon bonds of the silane linkage may be satisfied by oxygen atoms.

The liquid toner compositions of the present invention may be utilized in both direct and offset lithographic techniques; however, it should be noted that the liquid toner of the present invention is not limited in its use in lithographic techniques as it can be used for electrophotographic printing, high speed printing, ink jet printing, microfilm reproduction, facsimile printing, instrument recording, etc.

The primary advantage of the liquid toner compositions of the present invention is that they have characteristics which are required for making good offset litho masters as follows: (a) The toned areas are sufficiently hydrophobic/oleophilic to attract ink and repel a fountain solution; (b) Toned areas resist the attack of etch solution; (c) Toner particles have a uniform charge so that the non-image areas are not developed and solid areas are filled uniformly; and (d) Toner suspension has good stability, good adhesion to the image areas.

The use of conventional pigmented liquid toners have led to the obtaining of copies of poor quality or non-acceptability and therefore would not be useful in offset printing as they do not possess the enumerated characteristics.

The toner pigment, such as nigrosine and carbon black, should be of particularly fine particle size, preferably not greater than about 25 millimicrons particle diameter as measured by electron microscopy.

Example of inorganic pigment coloring agents which may be added to electrostatic liquid toners of the present invention are as follows: Carbon black, aniline black, cyanine black, spirit black, benzidine orange, benzidine yellow, methylene blue, alkali blue, cyanine blue, phthalocyanine green.

It is to be understood that the inclusion of a dye is not necessary in a toner to be used in a copier-duplicator as the coloring agent for the copy paper is the ink with which the master or blanket is dampened. The dye may be included in such a toner composition as a matter of convenience where it is desirable to see the image of the master.

The carrier liquid, as mentioned above, is a hydrocarbon fluid, it having been discovered that this particular class of carriers is uniquely capable of effecting the present invention by virtue of the following attributes: (a) quick evaporation, e.g., a thin film of the carrier will evaporate in a few seconds at a temperature below the char point of paper, so as to permit fast drying; (b) non-toxity; (c) low odor; (d) sufficient fluidity to allow the dispersed particles to migrate therethrough with ease so that they are capable of being quickly electrostatically attracted to and coupled with the pattern of electrostatic charges which is to be developed (e) not attacking the binder or other ingredients of the photoconductive coating on the lithographic master; (f) not bleeding the electrostatic charges before the particle is deposited so as to maintain any desire degree of contract; and (g) inexpensiveness.

In order to obtain these beneficial attributes, the petroleum fraction, i.e., parafffinic solvent, should have an evaporation rate at least as fast as that of kerosene, but slower than that of hexane. Thereby, the evaporation of the liquid from a film will be rapid, e.g., two seconds, or less, at a temperature below the char point of paper, it being customary to raise the temperature of the film of liquid developer to this level for the purpose of evaporating the developer after the electroscopic particles of the toner have been deposited by attraction on the electrostatically charged pattern. The petroleum fraction should have a low K.B. (Kauri-butanol) number, to wit, less than 30, and preferably between 25 and 30. This low K.B. number minimizes the possibility that the petroleum fraction will attack the coating binder, e.g., the binder for the zinc oxide, or will attack or dissolve the dispersed copolymer particles of the toner. The petroleum fraction also should be substantially free of aromatic liquid constituents, i.e., it should be substantially aromatic-liquid-free. This term as used herein, connotes that the proportion of aromatic liquids in the organic liquid carrier should not be in excess of approximately two percent by weight. The aromatic liquids have a strong tendency to attack the coating binders, e.g., the coating binders for zinc oxide, but in concentrations of less than two percent this tendency is so negligible as to be unnoticeable. The petroleum fraction must have a high electrical resistivity, e.g., in the order of at least $^{9}$ ohm centimeters, and a die-electric constant of less than 3.5 so that the liquid carrier will not dissipate the pattern of electrostatic charges which are to be developed. the TCC (Tagliabue closed cup) flash point of the liquid carrier should be at least 100° F (38° C) whereby under the conditions of use the liquid is considered non-flammable. The paraffinic solvent also is non-toxic. It possesses no objectionable odor and preferably is odor-free, this being denoted by the term "low odor."

Consonant with its low dielectric constant and high resistivity, the liquid carrier is non-polar. The petroleum fractions have two other advantages of low viscosity and inexpensiveness.

Examples of petroleum fraction organic liquid carriers having physical characteristics which fall within the foregoing criteria are Isopar G manufactured by Exxon Corporation and Soltrol 100 manufactured by Phillips Petroleum.

The polymeric material must be soluble in the saturated low K B solvent isoparaffinic hydrocarbon fluid and is preferably an acrylic polymer, an olefin-alkylated polyvinylpyrrolidone or a beta-pinone having a high degree of affinity for adsorption on the pigment. Examples of such polymeric materials are Neocryl B-707, manufactured by Polyvinyl Chemicals, Inc, Ganex 216, manufactured by GAF Corp. and Gammaprene A-115 manufactured by Reichold Chemicals, respectively. Throughout this specification, including the appended claims, the term polymer is used to specify a polymeric material soluable in a low K B solvent.

Various charge director compounds may be added, if desired to the toner compositions of the present invention. While it is not necessary with the electrostatic liquid toner composition of the present invention it might be desirable, for increased contrast, to include in the toner composition a positively or negatively charged charge director.

The charge directors, which are per se well known in the field of electrostatic liquid toners, must be soluble or dispersible in the paraffinic solvent and must create or augment an electrostatic charge on the sub-micron dispersed particles. Examples of usable charge directors pursuant to this invention are aluminum stearate; cobalt salt of 2-ethyl hexanoic acid; iron salt of 2-ethyl hexanoic acid; manganese salt of 2-ethyl hexanoic acid; zirconium salt of 2ethyl hexanoic acid; maganese linoleate; metal salts consisting of naphthenic acid and metals such as manganese, cobalt, nickel, zinc, chromium, magnesium, lead, iron zirconium, calcium and aluminum. Negative charge directors, or reversed toners, would include compounds of: phospholipids, lecithin, and sulfonates.

The desirable amount of such a charge director dissolved is the carrier liquid consisting of said hydrocarbon is in the range of from 0.01g to 1g per 1000 g of the carrier liquid.

Hydrophobic agents that have been found to be particularly suitable as part of the toner composition of the present invention are silane treated fumed silica. An example of such a silane treated fumed silica is Silanox 101, manufactured by Cabot Corporation, Boston, Massachussetts. Such a silane treated fumed silica preferably should have a particle size of 5–15 millimicrons and a BET surface area of 100–400 $m^2$/gm.

High relative humidity has been a problem in obtaining good prints in electrophotography. The present invention helps to solve this problem as the silanes are not sensitive to humidity.

The liquid toners of the present invention are made by first preparing a concentrate having the following weight percent composition.

hydrophobic agent — 1.0–12.0%
pigment — 0.1–12.0%
polymer — 10.0–40.0%
hydrocarbon — 40.0–65.0%.

The above concentrate, if desired, may include 1.0 to 6.0% dye. The concentrate is dispersed in a suitable apparatus, such as a sand mill, then added to a petroleum fraction liquid carrier in a ratio of 4 to 50 parts by weight carrier to one part by weight concentrate to produce the liquid toner.

The resulting liquid toner will generally have the following composition:

hydrophobic agent — 0.02 to 3.000%
pigment — 0.02 to 3.0%
polymer — 0.2 to 9.1% hydrocarbon carrier — 88 to 99.3%

Having described the basic concepts of the present invention, it will now be illustrated by reference to the following examples:

EXAMPLE I

The following mixture was prepared.

Silanox 101. . . (Cabot Corp). — 1.2 Parts
Mogul L Carbon Black. . (Cabot Corp). — 0.2 Parts
Alkali Blue RS Dye. . . (Allied Chemicals)— 2.1 Parts
Neocryl B-707. . . . . . . . . (Polyvinyl Chemicals) — 36.8 Parts
Isopar G. . . . (Exxon Corp.) — 59.7 Parts.

The Neocryl B707 was dissolved in the Isopar G and this combination was then dispersed along with the Silanox 101, Mogul L and Blue Dye in a sand mill. Five of this gms. concentrate was added to 135 grams of Isopar G containing two grams of 6% zirconium octoate. This toner was used for making copies on a zine oxide Mead Master Paper in a 253 PB copier, which copies were etched in a regular etching solution and used as masters to make prints on an offset press.

The imaged areas picked up ink and the non-image areas interacted with the fountain solution to render them continuously hydrophillic. The prints were quite satisfactorily for fill-inn, absence of trailing, good background, etc.

EXAMPLE II

A mill base concentrate was made having the following composition:

Mogul - L Carbon Black (Cabot Corp.)—11 Parts
Silanox 101 (Cabot Corp.)—11 Parts
Alkali Blue G (Allied Chemicals)—6 Parts
Ganex V-220 (G A F corp).—10 Parts
Soltrol - 100 (Phillips Petroleum) 62 Parts.

The above ingredients were ball milled for about 48 hrs.

An intensifier was made by taking, 10.3 grams of the

An intensifier was made by taking, 10.3 grams of the following:

1% Nuodex Gel Solution (TENNECTO CHEMICALS) — 26.0 grams
6% Zirconium Octoate (TENNECO CHEMICALS) — 7.3 grams
10% AC 432 Resin (Allied Chemical) in Soltrol 100 (Phillips Petroleum) 56.4 grams.

A liquid toner was made by diluting 20 grams of the above intensifier with 1000 grams Isopare G.

Copies were made using a Pitney Bowes 253 Copier and Mead Offset Master Paper. The toned master papers were etched and prints were made in an ATC CHIEF MULTILITH Press. More than 200 satisfactory copies were obtained.

EXAMPLE III

The following was proposed:

50% Solids L-31 Co-dispersion (Columbian Carbon) 16 Parts
Gammprene (A-115) (Reichhold Chemicals)—10 Parts
Alkali Blue G (ALLIED CHEMICALS) —1.2 Parts
Silanox 101 (CABOT CORP.) — 4.0 Parts
6% Zirconium Octate (TENNACO) — 8.3 Parts
Isopar G (Exxon Corp.) — 60.5 Parts The above were mixed in a high speed disperser for 30 minutes, and 20 grams of the concentrate were diluted to 100 grams with Isopar-G. This was used in a 253 Copier to make offset masters. Toned and etched masters were evaluated as described in example 1 and 2. More than 200 satisfactory copies were obtained.

Although specific ingredients, ranges and proportions have been disclosed in the description of the preferred embodiments of the present invention, other materials as listed above, where suitable, may be used with similar results. In addition, other well known additives may be incorporated in the compositions of the present invention to synergize, enhance, or otherwise modify the properties of the compositions. It will be apparent, therefore, that various changes and modifications can be made in the details of formulation, procedure and use without departing from the spirit of the present invention, said invention to be limited only as defined by the scope of the appended claims.

What is claimed is:

1. A hydrophobic, oleophilic concentrate to be used for a liquid toner for use in a copier duplicator, wherein an electrostatic image is created on a photoconductive layer, comprising: 0.1 to 12.0% pigment having a particle size not greater than 25 millimicrons, 10 to 40% polymer having a high affinity for the adsorption of said pigment, 40 to 65% hydrocarbon carrier having a K.B. number less than 30, a dielectric constant of less than 3.5, a resistivity of at least $10^9$ ohm centimeters, and a TCC flash point of at least 100° F, said hydrocarbon carrier having a composition containing less than 2% aromatic liquid constituents and said polymer being soluable in said hydrocarbon carrier and 1.0 to 12% silane treated fumed silica having a particle size of 5 to 15 millimicrons and a BET surface area of 100 to 400 $m^2$/gm, said silane having some of the bonds of the silane linkage substituted by saturated or unsaturated hydrophobic organic groups.

2. The concentrate of claim 1 wherein said hydrocarbon carrier has a petroleum fraction of paraffinic solvent.

3. The concentrate of claim 2 wherein said hydrocarbon carrier has an aromatic liquid constituent no greater than two percent by weight.

4. The concentrate of claim 2 wherein said pigment is carbon black, said polymer is selected from the group consisting of acrylic, olefin-alkylated polyvinylpyrroledone and beta-pinene and said hydrocarbon carrier is a isoparaffinic hydrocarbon fluid.

5. The concentrate of claim 4 including 1.0 to 6.0% dye.

* * * * *

UNITED STATES PATENT AND TRADEMARK OFFICE
CERTIFICATE OF CORRECTION

PATENT NO. : 4,019,911
DATED : April 26, 1977

INVENTOR(S) : Bheema R. Vijayendran - R. Clark DuBois

It is certified that error appears in the above-identified patent and that said Letters Patent are hereby corrected as shown below:

Column 1, line 36, change "were" to -- where --.

Column 1, line 37, change "were" to -- where --.

Column 1, line 43, change "wereby" to -- whereby --.

Column 2, line 59, after "inorganic" insert -- or organic --.

Column 3, line 20, change "tract" to -- trast --.

Column 3, line 49, before " $^9$ohm" insert -- $10^9$ohm --.

Column 3, line 52, change "the" to -- The --.

Column 4, line 4, change "beta-pinone" to -- beta-pinene --.

UNITED STATES PATENT AND TRADEMARK OFFICE
CERTIFICATE OF CORRECTION

PATENT NO. : 4,019,911

DATED : April 26, 1977

INVENTOR(S) : Bheema R. Vijayendran - R. Clark DuBois

It is certified that error appears in the above-identified patent and that said Letters Patent are hereby corrected as shown below:

Column 5, line 41, remove duplicate line "An intensifier was made by taking, 10.3 grams of the".

Column 5, line 54, change "ATC" to -- ATF --.

Column 6, line 3, change "Gammprene" to -- Gammaprene --.

Column 6, line 7, change "Octate" to -- Octuate -- - and "TENNACO" to -- TENNECO --.

Signed and Sealed this

***Eighth* Day of *August 1978***

[SEAL]

*Attest:*

RUTH C. MASON
*Attesting Officer*

DONALD W. BANNER
*Commissioner of Patents and Trademarks*